May 15, 1934.  D. H. LEE  1,958,481
AUTOMOBILE SEAT
Filed May 15, 1931  3 Sheets-Sheet 1
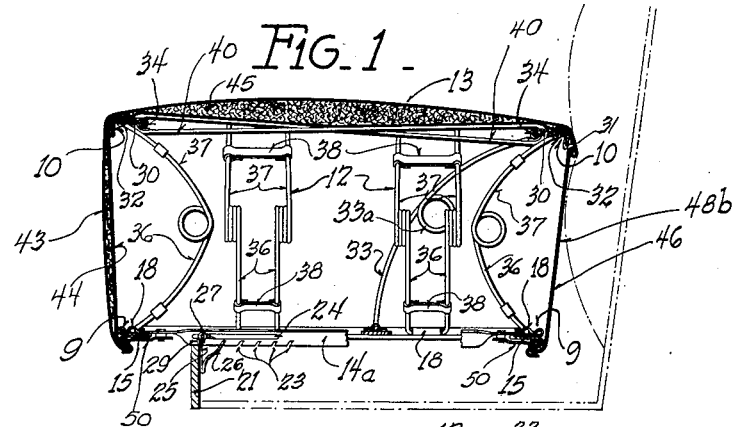
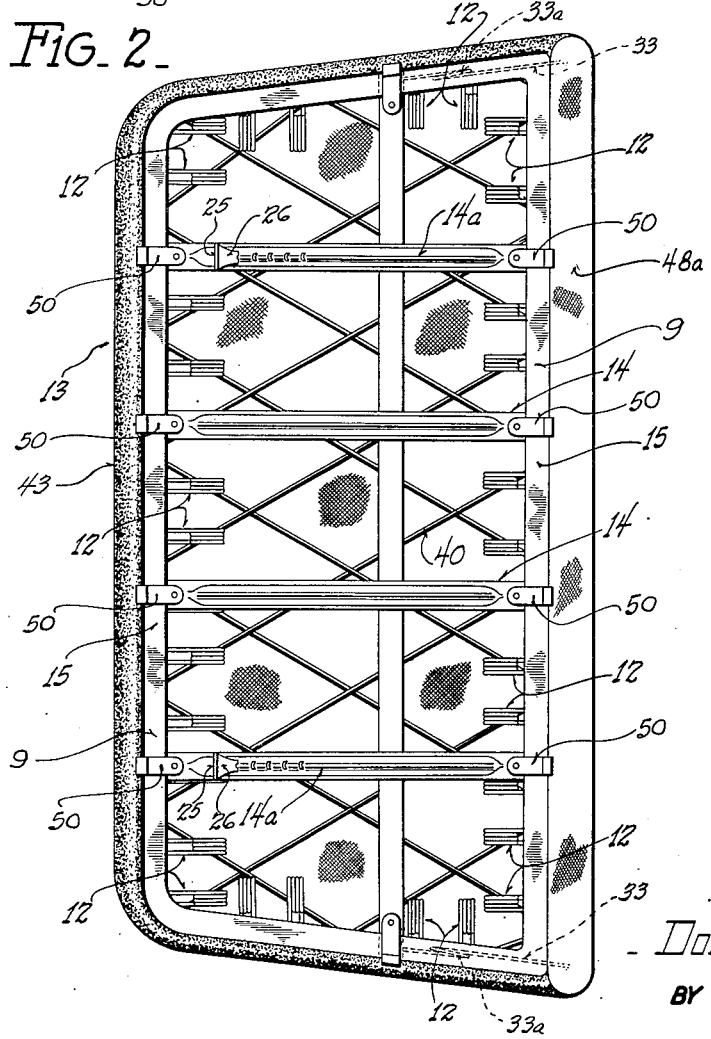
INVENTOR
Donald H. Lee
BY
ATTORNEY May 15, 1934.　　　　　　　D. H. LEE　　　　　　　1,958,481
AUTOMOBILE SEAT
Filed May 15, 1931　　　　3 Sheets-Sheet 2
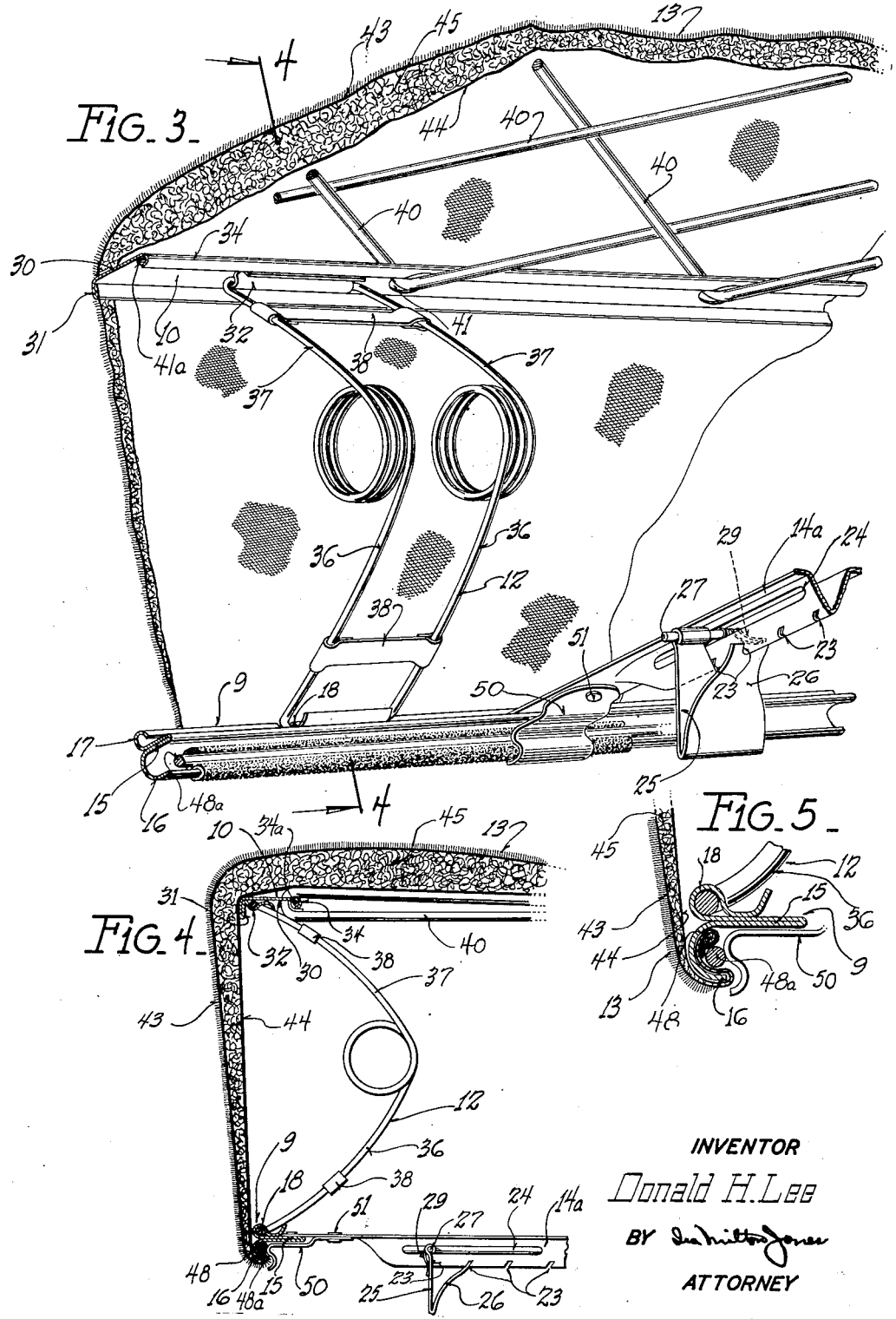
INVENTOR
Donald H. Lee
BY Ira Milton Jones
ATTORNEY May 15, 1934.         D. H. LEE         1,958,481
AUTOMOBILE SEAT
Filed May 15, 1931         3 Sheets-Sheet 3
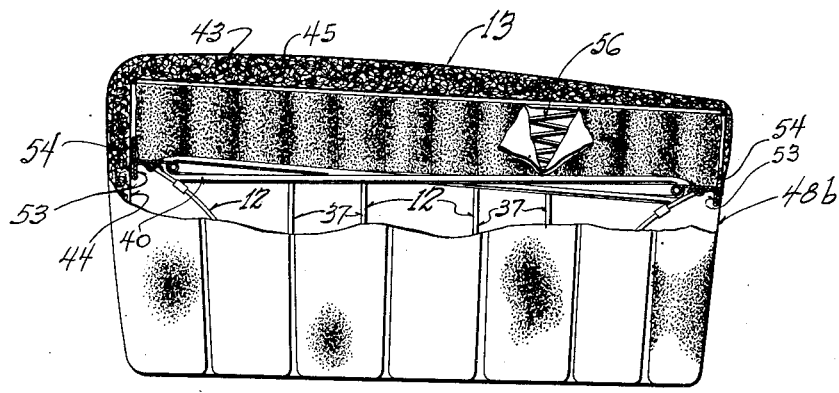
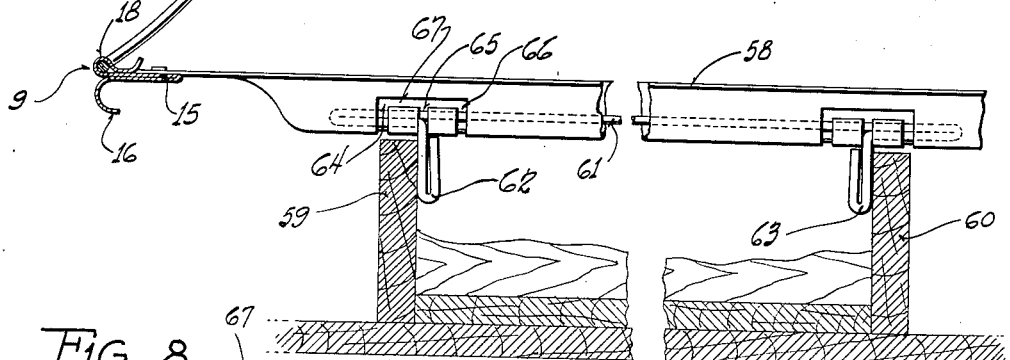
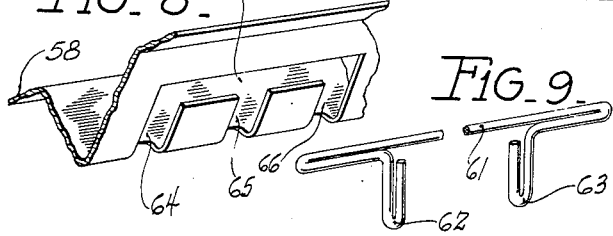
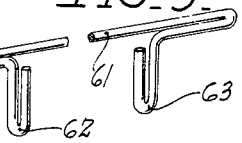
INVENTOR
_Donald H. Lee_
BY
ATTORNEY Patented May 15, 1934

1,958,481

UNITED STATES PATENT OFFICE 1,958,481

AUTOMOBILE SEAT

Donald H. Lee, Kenosha, Wis.

Application May 15, 1931, Serial No. 537,572

13 Claims. (Cl. 155—179)

This invention relates to automobile seats, more particularly to a seat having a plurality of main springs and separate resilient means supporting the top of the seat.

It is an object of the present invention to provide a seat, the main springs of which will take up the shock in a manner similar to a shock absorber, and having separate resilient means supporting the cover of the seat to give riding comfort.

A further object of the invention is to provide a seat which may be adjusted forwardly or rearwardly with relation to the back of the seat and which has an adjustable stop to hold the seat in a plurality of positions.

It is a further object of the invention to provide a seat which can be readily knocked down, or assembled so as to facilitate shipping and reduce handling expenses.

It is a further object of the invention to improve the construction of seats in general, so as to improve their riding qualities, reduce the cost of manufacture and give a generally superior seat.

With the above objects in view, the nature of which will become apparent as the description proceeds, there is provided the following forms of the invention which while typical applications are not to be construed as in any way limiting the invention to the precise forms of the construction herein shown and described.

It is to be understood that the invention is limited only by the scope of the appended claims or their equivalents.

Referring to the drawings, in which like numerals indicate like parts throughout the several views:

Figure 1 shows a cross section through one form of the invention;

Figure 2 shows a seat illustrated in Figure 1 as seen from below;

Figure 3 is a detail section in perspective showing details of a seat stop member and spring construction;

Figure 4 is a detail similar to Figure 3 but in cross section rather than perspective;

Figure 5 shows the means of attaching the seat cover to the lower frame of the seat;

Figure 6 is a view partly in section showing a slightly modified form of the invention;

Figure 7 is a modification of the invention showing a slightly different form of the seat stop member;

Figures 8 and 9 are details of stop members as seen in perspective.

Referring first to the form of the construction shown in Figures 1 to 5 inclusive, the seat comprises a pair of parallel frames generally designated 9 and 10 resiliently held apart by a plurality of springs 12 and upholstered with leather, mohair or other suitable material and generally designated 13 and a plurality of ribs 14 all which will be later described in detail.

The lower frame which has been generally designated 9 is made of sheet metal and shaped generally in the configuration of a T bar with the opposite edges rolled back as shown in Figures 3 and 4. The body portion of the frame 9, designated 15, is made of double thickness by bending the sheet metal double and has at the ends thereof, turned back portions 16 and 17 formed of general semicircular shape. The turned back portion 17 is cut away at parts along the length and depth of the frame and formed into clamps 18 shown in Figures 4 and 5 to hold the lower end of the spring 12. Connected to the frame 9, are a plurality of ribs 14 which rest on the sills 21 of the automobile and support the seat off the floor thereof.

The two end ribs which may be numbered 14a are formed into stops as shown in Figures 3 and 4. The members 14 are generally of channel formation and may be pressed or stamped out of heavy sheet metal. The members 14a are notched at 23 for a purpose hereinafter described and may be slit so as to form two rectangular slots 24 through opposite sides of the channel.

The stop member consists of two legs 25 and 26 bent to form an acute angle, the leg 25 being vertical or approximately vertical whereas the leg 26 slopes upwardly and rearwardly. The rod 27 passes through the two slots 24 and through an eye formed at the upper edge of the member 25 to fasten the stop member pivotally to the channel.

The legs 26 fit in the notches 23 as shown in Figure 4 to hold the leg 25 in a vertical position and retain the stop against slipping rearwardly. To hold the stop 25 with the leg in a vertical position, a spring 29 shown in Figures 3 and 4 surrounds the rod 27 and engages at one extremity the plate 25 as shown in Figure 4 at the other, the inside of the channel 14a and is so constructed as to hold the member 26 in constant engagement with the notch 23. The stop 25, 26 may be thus adjusted horizontally so as to permit the seat to be moved out any desired distance by adjusting the position of the stop 25, 26 with respect to the member 14a.

The upper frame 10 is of rectangular cross section conforming in general outline to that of the frame 9 and is best seen in Figures 3 and 4. Referring to these figures, the frame 10 is of the general channel section and comprises a horizontal member 30, an outside vertical member 31 bent back to form a double thickness as shown, and a rear member 34. At points in the upper frame corresponding to positions of the clamps 18 of the lower frame 9, the bent-up portion of the vertical leg 31 is extended outwardly as shown best in Figure 4 at 32 to form an upper clamp for retaining the spring 12. The opposite leg of the channel designated 34 may be made of semi-circular cross section for a purpose hereinafter described.

The upper frame 10 and lower frame 9 are resiliently held apart by means of springs 12 as hereinbefore described. The springs 12 are formed with two branches generally designated 36 and 37 at an acute angle to each other and contain therebetween a helical spring which resists a decrease in the angle between the branches 36 and 37. A retaining member 38 may be formed of sheet metal holding the helical springs in relatively correct position.

The ends of the members 36 and 37 fasten beneath the clamp 18 and 32 in the members 9 and 10 respectively.

A stay brace 33 which keeps the seat rectangular when a weight is placed on it, extends from the upper rear corners to a point on the lower frame 9 intermediate the front and rear of the seat. The member 33 may be formed of spring material with a helical spring 33a intermediate the ends. The ends of the spring 33 removably fasten in clips in the upper and lower frames respectively, to permit ready assembly and disassembly of the seat.

A plurality of elastic cords 40 pass through holes 41 in the horizontal portion 30 of the frame 10, and pass over rods 41a held in the semi-circular portion 34 of the frame 10, which protect the elastics from being cut by the frame, the elastics being interlaced between the frame members to form a support for the upholstered cover 13. The cover 13 comprises an outer finishing cloth 43, which may be leather, mohair or other suitable material, a base cloth 44 and a padding 45 of suitable nature, placed between the base cloth 44 and the covering 43.

As is best shown in Figure 4, the padding is thickest on top and gradually tapers on the front face of the seat to zero at the lower edge, where base cloth is connected to the finishing cloth. The connection in front between the base cloth 44 and the finishing cloth 43 is made with a bead, or enlarged portion which may be a cord 48, about which the covering is fastened, or may be formed by merely doubling over the cloth. Since there is no necessity to carry the padding down the rear of the seat, the base and finishing cloths may be joined together adjacent the top of the seat and connected to the lower rear frame through a fabric connecting member 48b.

In assembling, the cover is stretched over the top of the seat and down the sides. Beads 48, which are formed entirely around the periphery of the lower ends of the cover, are folded around the semicircular section 16 and secured inside the section 16, beneath a rod member 48a, as seen in Figure 5, by means of clips 50 pivotally mounted on the ribs 14, by the rivets or other suitable means 51. The rod 48a may be made in the form of a rectangular frame fitting inside the section 16 on all four sides of the seat.

It will thus be seen that the entire seat may be readily disassembled and assembled by removing the cover 13 from the lower frame member 9 and removing the springs 12 from the clips 18 and 32 in the lower and upper frames respectively, and that the seat in knocked down condition may be packed in a relatively compact box for shipment and thus reduce considerably the cost of transporting.

In the modification shown in Figure 6, a Marshall type spring 56 overlies the interlaced elastic bands 40 to give greater riding comfort. The spring 56 is formed of a plurality of relatively light, helical springs, each spring being cloth covered and adjacent springs being stitched together to form an integral bank of springs. The upper frame 53 shown in Fig. 6 has portions 54 turned up at intervals to provide retainers for the spring 56, which serves to keep the spring 56 in place. In other respects the frame 53 is similar to the frame 10 shown in Figs. 1, 3 and 4.

The form shown in Figure 6 gives greater riding comfort than the form shown in Figures 1 to 5 inclusive due to the plurality of relatively light springs 56 which individually press upwardly and conform the cover to the shape of the body. As in Figures 1 to 5 inclusive, the springs 12 in Figure 6 are designed to take the main road shocks, while the springs 56 support the body, to give riding comfort.

The modification shown in Figure 7 discloses a slightly different form of supporting means of the seat in which the ribs 58 rest on the seat stools 59 and 60 of the automobile and have a rod member 61 having stops 62 and 63 fixed therewith by bending the rod as shown in Figure 9. The ribs 58 are pressed into a channel shape as were the ribs 14 in Figures 1 to 5, and have slots 64, 65, 66 and 67 cut therein as shown in Figures 7 and 8. The rod 61 fits in the lower portion of the channel and the stops 62 and 63 project out through one of the slots 64, 65 or 66.

When it is desired to move the seat in one direction, or the other, the stop 62 and 63 may be turned up into the slot 67 and the stops 62 and 63 moved forwardly or rearwardly as desired. Being that the stops 62 and 63 are attached to the same rod and are a constant distance apart, they tend to hold the seat in rigid position regardless of which of the slots 64, 65 and 66 the stops project from.

Having thus described the invention, what is claimed as new and desired to secure by Letters Patent is:

1. In an automobile seat or the like, a pair of spaced frames, a spring between said frames constantly urging said frames apart, one of said frames being provided with a section having a curved periphery, a cover passing over said frames and having a beaded edge fitting into said curved periphery, a plurality of ribs joining the members of said last named frame, and members on said ribs to hold said bead in said curved periphery.

2. In a automobile seat or the like, a first frame, a plurality of resilient lacings stretched between the members of said frame, a second frame in spaced relation to said first frame, spring means having opposite ends thereof attached to said frames, and constantly urging said frames apart, said second frame being provided with a portion having a curved section, a cover stretching over said frames, and adapted to be retained in said curved portion, a plurality of ribs positioned between the members of said second frame and means on said ribs to retain the end of said cover in said curved portion.

3. In an automobile seat or the like, a first frame, a plurality of resilient lacings stretched between the members of said frame, a second frame in spaced relation to said first frame, spring means having opposite ends thereof attached to said frames respectively, and constantly urging said frames apart, said second frame being provided with a portion having a curved section, a cover stretching over said frames, and adapted to be retained in said curved section a plurality of ribs positioned between the members of said second frame, and clips pivotally mounted on said ribs to retain the edge of said cover in said curved portion.

4. In an automobile seat or the like, a pair of spaced frames, means resiliently maintaining said frames apart, a plurality of triangular ribs joining two of the members of one of said frames and adapted to support the seat upon seat stools, said ribs each having a longitudinal slot therein intersected by a plurality of transverse slots, and a rod supported in the bottom of said ribs with a portion projecting out of one of said transverse slots to hold the seat in adjusted position on the stools.

5. In an automobile seat or the like, a pair of spaced frames, a spring between said frames constantly urging said frames apart, one of said frames being provided with a section having a curved periphery, a cover passing over said frames, a beaded edge on said cover fitting into said curved periphery, a plurality of ribs joining the members of said last named frame, and clips pivotally mounted on said ribs to retain the edge of said cover in said curved periphery.

6. In an automobile seat or the like, a pair of spaced frames, a spring between said frames constantly urging said frames apart, one of said frames being provided with a section having a curved periphery, a cover passing over said frames, a beaded edge on said cover fitting into said curved periphery, a rod seating in said curved portion and adapted to hold the beaded edge of said cover therein, a plurality of ribs joining the members of said last named frame and members on said ribs to hold said bead and said rod in said curved portion.

7. In an automobile seat or the like, a first frame, a plurality of resilient lacings stretched between the members of said frame to form a cushion for the seat, a second frame in spaced relation to said first frame, a spring, resilient means having the opposite ends thereof attached to said frames and constantly urging said frames apart, said second frame being provided with a portion having curved periphery, a cover stretching over said lacing and adapted to be retained in said curved periphery, a rod fitting in said curved periphery to hold said cover therein, a plurality of ribs positioned between the members of said second frame, and means on said ribs to retain the rod in said curved periphery.

8. In an automobile seat or the like, a pair of spaced frames, means resiliently maintaining said frames apart, a plurality of triangular ribs joining two of the members of one of said frames and adapted to support the seat upon seat stools, one of said ribs having a pair of longitudinal slots therein intersected by a plurality of transverse slots and a rod supported in the bottom of said rib, a plurality of projections on said rod extending out through said transverse slots to hold the rod in an adjusted position in said rib and form a stop to hold the seat in adjusted position on the stools.

9. In an automobile seat, a substantially rectangular frame provided with a downwardly and inwardly directed portion forming a substantially continuous channel about the periphery of the frame with the open side thereof facing the inside of the frame, spring cushion means supported on said frame, a cover disposed over said spring cushion means, a beaded edge on the cover fitting into said channel, and a plurality of clips pivotally mounted on a frame carried part and projectable into the channel to engage the beaded edge of the cover and detachably secure the same in the channel.

10. In an automobile seat, a pair of spaced frames, each of said frames having a flat part substantially parallel to the plane of the frame, and a flange directed laterally from the flat part at the outer periphery thereof, the flanges of the two frames facing each other, spaced retaining clips carried by the frames and having curled loops and flat end portions overlying the inner faces of said flat part of the frames adjacent the laterally directed flanges, the clips of one frame being formed as parts of the flange of said frame, and the clips of the two frames being substantially in line, and a plurality of independent spring units having end portions adapted to be snapped under said flat end portions of the retaining clips and into the curled loops of the clips, said spring units retaining the frames assembled and tending to yieldably spread the same apart.

11. In an automobile seat, a lower supporting frame, an upper auxiliary frame, spring units to maintain the frames yieldably spaced apart, each side of the upper frame comprising, a flat part parallel to the plane of the frame, a downturned folded outer edge portion forming a reinforcing flange, a downwardly and inwardly curled inner edge portion, and a wire rod disposed in said downwardly and inwardly curled inner edge portion, retaining clips formed as integral extensions of said first mentioned downwardly folded outer edge portion at spaced intervals with which said spring units are detachably engaged, and an elastic lacing stretched across the sides of said upper frame, said lacing passing through openings in the flat part of the frame adjacent the inner curled edge thereof to engage the wire disposed in said edge whereby the stress of said lacing is imparted to the frame through said wire.

12. In an automobile seat, a pair of superimposed frames formed of sheet metal with flat wall portions parallel to the planes of the frames, a plurality of helical springs having extended ends bent substantially at right angles at their extremities, and retaining clips carried by the frames and having curled loops and flat end portions yieldably urged into flat engagement with the inner faces of said flat wall portions of the frames and curved outwardly to facilitate snapping the bent extremities of the springs into the curled loops to be held thereby against the inner faces of said flat wall portions.

13. In an automobile seat, a substantially rectangular supporting frame, a spring cushion mounted on said frame, a cover disposed over said spring cushion with its edge connection to the frame, a plurality of transverse ribs connecting two sides of the frame and adapted to support the seat upon a seat stool, stops, and means to adjustably mount said stops from the transverse ribs, said means enabling ready adjustment of the stops along the transverse ribs and said stops being engageable with the seat stool to hold the seat thereon in different positions of adjustment.

DONALD H. LEE.